US011655350B2

(12) United States Patent
Broderick et al.

(10) Patent No.: US 11,655,350 B2
(45) Date of Patent: May 23, 2023

(54) SOLVENT BASED APPROACH TO POST-CONSUMER RECYCLING OF POLYETHYLENE TEREPHTHALATE

(71) Applicant: UOP LLC, Des Plaines, IL (US)

(72) Inventors: Erin Broderick, Arlington Heights, IL (US); Rodrigo Lobo, Des Plaines, IL (US); Francis Lupton, Evanston, IL (US); Shurong Yang, Des Plaines, IL (US); Raymond Shih, Elgin, IL (US); Andrea Bozzano, Northbrook, IL (US); Hayim Abrevaya, Kenilworth, IL (US)

(73) Assignee: UOP LLC, Des Plaines, IL (US)

( * ) Notice: Subject to any disclaimer, the term of this patent is extended or adjusted under 35 U.S.C. 154(b) by 125 days.

(21) Appl. No.: 17/232,840

(22) Filed: Apr. 16, 2021

(65) Prior Publication Data

US 2022/0332914 A1 Oct. 20, 2022

(51) Int. Cl.
*B29B 9/04* (2006.01)
*C08J 11/08* (2006.01)

(52) U.S. Cl.
CPC ............ *C08J 11/08* (2013.01); *C08J 2367/02* (2013.01); *C08J 2423/02* (2013.01)

(58) Field of Classification Search
CPC ..... C08J 11/08; C08J 2367/02; C08J 2423/02
USPC ........... 521/47; 528/190, 193, 194, 271, 272
See application file for complete search history.

(56) References Cited

U.S. PATENT DOCUMENTS 4,064,079 A * 12/1977 Sidebotham ............. C08J 11/08
521/48.5
5,554,657 A 9/1996 Brownscombe et al.

FOREIGN PATENT DOCUMENTS

GB 1201523 A * 5/1968
HU 218012 * 5/2000

OTHER PUBLICATIONS

J.G Poulakis, "Dissolution/reprecipitation: a model process for PET bottle recycling", Apr. 18, 2001, Publisher: John Wiley and Sons, Inc.
Search Report and Written Opinion for H221254-WO dated Jun. 1, 2022.

* cited by examiner

*Primary Examiner* — Terressa Boykin
(74) *Attorney, Agent, or Firm* — Paschall & Associates, LLC; Mark Goldberg

(57) ABSTRACT

A process is provided of treating a feed comprising polyethylene terephthalate comprising dissolving said feed in a polar solvent at a temperature between about 100 to 250° C. to produce a dissolved feed; then adding an anti-solvent that is less polar than said polar solvent followed by cooling a resulting mixture resulting in precipitation of purified polyethylene terephthalate and then separation of solid purified polyethylene terephthalate from remaining liquids.

20 Claims, No Drawings

SOLVENT BASED APPROACH TO POST-CONSUMER RECYCLING OF POLYETHYLENE TEREPHTHALATE

Plastics can be very versatile materials, but the traditional manner of using them is incredibly wasteful. Oil and gas are withdrawn from the earth and processed to make plastic products, some of which are used only once and then thrown away. Millions of tons of plastics each year, costing billions of dollars to produce end up in landfills, burned in incinerators or otherwise lost to the environment. A significant portion of these plastics escape or are released into the ocean and it is anticipated that there will be more plastic (by weight) than fish in the ocean within several decades.

There is now a growing effort to rethink the way that plastics are made, used and reused with a growing interest in developing a circular economy for plastics in which plastics do not become waste or pollution. A circular economy is an economic system in which materials are designed to be reused. Products and the systems that they are in are designed so that no materials are lost, no toxins are leaked and the maximum use possible is made of every process, material and component. The circular economy benefits society, the environment and the economy.

In 2017, 301 million metric tons of plastic was produced, and only 10% of plastic was recycled. With an increased focus in the world on sustainability, an increase in the circularity of plastics is desired. Current mechanical recycling methods include sorting, shredding, and washing plastics. If the plastic meets the specification, it is sold; the off spec material is landfilled or incinerated. A large portion of the plastics collected by waste management companies cannot be readily recycled due to the presence of additives that alter the color and transparency of the material. Specifically, in the case of PET the material to be recycled must satisfy stringent color specifications. These are measured via colorimetry. The colorimetry measurement breaks down the color of reflected light from a sample in three components as follows: L is whiteness, a* is redness, and b* is yellowness. In general, higher L values are desired and a* and b* values that are close to zero are also desired as it implies that the plastic has no color or light absorbing ability.

To minimize the impact that colored and opaque plastic will have on the properties of the final product, the plastic is sorted in mechanical recycling facilities and all the colored plastic is either rejected or downcycled (used for lower grade applications). This results in an inability to fully utilize all the PET that is collected. The rejected PET typically contains chemicals that introduce color to the plastic. These chemicals can be divided into two classes: dyes, small molecules that impart color to the plastic while being "dissolved" (i.e. molecularly dispersed) throughout the plastic; and pigments, which are very small solid particles that are dispersed throughout the plastic. Another approach is desired to recycle or reuse the material. Such an approach has now been found. A dissolution/precipitation approach would dissolve the plastic, in this case polyethylene terephthalate. A filtration step may be performed prior to precipitation to remove any undissolved contaminants such as insoluble pigments. Upon precipitation, the contaminants, such as dyes or other coloring agents would stay in solution. This would allow more plastic to meet the spec to be sold that would otherwise be landfilled or incinerated.

SUMMARY OF INVENTION

A process is provided of treating a feed comprising polyethylene terephthalate comprising dissolving the feed in a polar solvent at a temperature between about 100 to 250° C. to produce a dissolved feed; filtering the dissolved feed to remove any insoluble materials, then cooling the dissolved feed to precipitate a solid comprising precipitation of purified polyethylene terephthalate and further separating solid purified polyethylene terephthalate from remaining liquids. The process may further comprise centrifuging the dissolved feed to separate the purified polyethylene terephthalate from the dissolved feed. An anti-solvent that is less polar than the polar solvent may be added to the dissolved feed followed by the cooling of the dissolved feed to precipitate the purified polyethylene terephthalate, wherein said remaining liquids comprise polar solvent and anti-solvent. These remaining liquids may be purified by distillation, adsorption or phase separation and separated into a polar solvent and anti-solvent for reuse. The feed may comprise a mixture of post-consumer polyethylene terephthalate waste such as used water bottles, soda bottles, food containers and other polyethylene terephthalate articles. The feed in the polar solvent is at a temperature from about 150-200° C. and a pressure is about 1-100 atmospheres and preferably at a pressure is about 1-5 atm. The polyethylene terephthalate and the polar solvent are at a weight ratio from about 1:100 to 1:1 and preferably at a weight ratio of about 1:50 to 1:1. The solvent and the anti-solvent are present at a weight ratio of from about 10:1 to 1:10. The polyethylene terephthalate remains in the polar solvent from about 1 minute to 2 hours. The polar solvent has Hansen solubility parameter of about $\delta d=15-20$, $\delta p=4-20$, $\delta h=3-10$ and the anti-solvent has a Hansen solubility parameter of about $\delta d=12-20$, $\delta p=0-4$ $\delta h=-0-4$. The polar solvent may be selected from N-methylpyrrolidone, dimethylsulfoxide, dihydrolevoglucosenone, gamma-valerolactone, dimethyl isosorbide, N-methylcaprolactam, eucalyptol and mixtures thereof. The anti-solvent is selected from alkanes, alkenes, aromatic hydrocarbons, and mixtures thereof. The dissolved feed may be filtered prior to addition of said anti-solvent to separate any undissolved material or dyes. This filtration may be by a filtration aid such as those selected from diatomaceous earth, activated carbon and mixtures thereof. The dissolved feed may also be filtered by a rigid filtering element selected from a sintered metal filter, a metal oxide filter or a filter membrane. The process may be a batch, continuous or semicontinuous process.

DETAILED DESCRIPTION

The invention uses a polar solvent, such as N-methylpyrrolidone, dimethylsulfoxide, dihydrolevoglucosenone, gamma-valerolactone, dimethyl isosorbide, N-methylcaprolactam and mixtures thereof to dissolve (polyethylene terephthalate) PET at an elevated temperature between about 110-190° C. depending upon the particular solvent, the solvent to PET ratio, and the amount of color agents. The appropriate polar solvents may be determined based on the Hansen solubility parameters that can be used to predict when one material will dissolve in another and form a solution based on like materials dissolving in like materials. Each molecule is given three Hansen parameters, each generally measured in MPa. These are $\delta_d$ the energy from dispersion forces between molecules, $\delta_p$ the energy from dipolar intermolecular force between molecules and, $\delta_h$ the energy from hydrogen bonds between molecules. Herein the polar solvents will have $\delta_d=15-20$, $\delta_p=4-20$, $\delta_h=3-10$.

The resulting mixture may be filtered to remove any undissolved material, dyes or pigments. A filter such as a sintered metal filter, metal oxide filter or filter membranes may be used as well as a filtration aid such as a diatomaceous earth, activated carbon and mixtures thereof may be used. The effectiveness of the filter can be enhanced by depositing a portion of the PET on to the filtration particles by reducing the temperature of the mixture after full dissolution. This partial precipitation allows easier filtering. The formation of larger particles can also be achieved by the addition of a flocculating agent that allows for the agglomeration of the dispersed solids.

As the pigments are removed the opacity of the resulting liquid is reduced, and can even be made completely translucent. The third step is the precipitation of PET with reduced amount of color this is performed by mixing the solution of PET in the solvent with an antisolvent; a wide variety of anti-solvents are available (e.g. dodecane), this allows a solid to form when the temperature is slowly reduced. A similar approach may be taken with a variety of polyolefins. An anti-solvent, typically a non-polar solvent such as C4-C20 alkanes, cyclic alkanes such as decalin or tetralin, C4-C20 alkenes, limonene, dienes, and aromatic hydrocarbons including benzene, toluene, xylenes, and mesitylene, is added to help precipitate the PET. The anti-solvent will have a Hansen solubility parameter of $\delta d=12\text{-}20$, $\delta p=0\text{-}4$ $\delta h=-0\text{-}4$. Upon slight cooling, a precipitate will form. This process is different compared to prior art because the solvents that are used are already used in commercial operations for other purposes (such as N-methylpyrrolidone) or are less toxic alternatives to those that have been used (such as dimethylsulfoxide and dihydrolevoglucosenone (Cyrene)). In addition, a majority of prior art solvents depolymerize the polymer such as through chemical recycling methods. The process described herein does not depolymerize the polymer. Potential technical benefits are that it would be an inexpensive process to purify PET that is typically landfilled or discarded, provides a low carbon dioxide footprint compared to chemical recycling, and is a potentially lower cost alternative to chemical recycling. It may also be more environmentally friendly. This process would be one part of a circular plastics economy.

The process may also involve integration of the dissolution/precipitation process for polyethylene terephthalate with the overall process for handling mixed plastic waste. For example, the mixed plastic waste could contain polyolefins as well as polyethylene terephthalate. Other thermoplastic plastics may be present as well. The plastic waste may be separated by density differences, hand sorting or other methods. The polyolefins may be sent to a pyrolysis reactor or to mechanical recycling to be further processed while the polyethylene terephthalate is treated as described above.

EXAMPLES 1-3

In a vial, a solvent (9 g) was added to PET feed (0.3 g). The mixture was stirred at 300 rpm at 165° C. until all the PET feed was dissolved (5 min). Dodecane was added slowly (around 8 mL). The vial was removed from the heat and allowed to sit at room temperature for a few minutes. A solid white precipitate formed at the bottom of the vial. The hot liquid was removed with a pipette. The white solid was washed with acetone, and the solid was dried on a vacuum line.

To determine the amount of dye and pigment removal, the starting material and the product were characterized using colorimetry. For reference, the colorimetry values of PET originating from a clear water bottle was also measured.

Table 1 shows the feeds and solvents used for each of the examples 1-3, along with the colorimetry values of the resulting PET.

TABLE 1

|  | PET Feed | Solvent | Anti-Solvent | L | a* | b* |
|---|---|---|---|---|---|---|
| Refence | Cryoground Clear PET from Water Bottles |  |  | 83.11 | 0.18 | 2.77 |
| Example 1 feed | Reject PET |  |  | 77.15 | −2.28 | 2.35 |
| Example 2&3 feed | Green PET |  |  | 74.19 | −16.4 | 10.67 |
| Example 1 product | Reject PET | NMP | Dodecane | 86.42 | −1.18 | 4.21 |
| Example 2 product | Green PET | N-Methylcaprolactam | Dodecane | 84.57 | −1.47 | 5.7 |
| Example 3 product | Green PET | Gamma-Valerolactone | Dodecane | 90.79 | −1.34 | 2.7 |

EXAMPLES 4-7

In a round bottom flask, gamma-valerolactone (GVL, 45.36 g) and opaque (pigment-containing) PET (1.10 g) were stirred at 300 rpm at 190° C. for 1.5 h. The GVL and PET mixture were filtered with celite and activated carbon. The filtration apparatus was preheated to 130° C. prior to filtration. The filtrate was then heated to 190° C., and dodecane (11.26 g) was added to the filtrate. Precipitation occurred, and the mixture was filtered to collect a white solid (0.38 g).

TABLE 2

|  | Feed | Solvent | Anti-Solvent | Funnel Temperature (° C.) | L | a* | b* |
|---|---|---|---|---|---|---|---|
| Examples 4-6 feed | Cryoground Black PET |  |  |  | 37.06 | −0.04 | 0.31 |
| Example 7 feed | Cryoground Sunk Layer from plastic |  |  |  | 48.47 | 0.31 | 2.17 |

TABLE 2-continued

| | Feed | Solvent | Anti-Solvent | Funnel Temperature (° C.) | L | a* | b* |
|---|---|---|---|---|---|---|---|
| Example 4 product | waste mixture Black PET GVL/dodecane 110° C. frit | GVL | Dodecane | 110 | 53.00 | 0.16 | 1.19 |
| Example 5 product | Black PET GVL/dodecane 130° C. frit | GVL | Dodecane | 130 | 83.92 | −0.20 | 2.90 |
| Example 6 product | Black PET GVL/dodecane 145° C. frit | GVL | Dodecane | 145 | 76.90 | 0.02 | 2.99 |
| Example 7 product | Sunk Plastic GVL/dodecane 130° C. frit | GVL | Dodecane | 130 | 78.24 | 0.10 | 1.66 |

SPECIFIC EMBODIMENTS

While the following is described in conjunction with specific embodiments, it will be understood that this description is intended to illustrate and not limit the scope of the preceding description and the appended claims.

A first embodiment of the invention is a process of treating a feed comprising polyethylene terephthalate, the process comprising dissolving the feed in a polar solvent at a temperature between about 100 to 250° C. to produce a dissolved feed; then cooling the dissolved feed to precipitate a solid comprising precipitation of purified polyethylene terephthalate and further separating solid purified polyethylene terephthalate from remaining liquids. An embodiment of the invention is one, any or all of prior embodiments in this paragraph up through the first embodiment in this paragraph further comprising centrifuging the dissolved feed to separate the purified polyethylene terephthalate from the dissolved feed. An embodiment of the invention is one, any or all of prior embodiments in this paragraph up through the first embodiment in this paragraph further comprising adding an anti-solvent that is less polar than the polar solvent to the dissolved feed followed by the cooling of the dissolved feed to precipitate the purified polyethylene terephthalate, wherein the remaining liquids comprise the polar solvent and the anti-solvent. An embodiment of the invention is one, any or all of prior embodiments in this paragraph up through the first embodiment in this paragraph wherein the remaining liquids are purified by distillation, adsorption or phase separation and separated into the polar solvent and the anti-solvent for reuse. An embodiment of the invention is one, any or all of prior embodiments in this paragraph up through the first embodiment in this paragraph wherein the feed comprises a mixture of post-consumer polyethylene terephthalate waste. An embodiment of the invention is one, any or all of prior embodiments in this paragraph up through the first embodiment in this paragraph wherein the post-consumer polyethylene terephthalate waste, is selected from used water bottles, soda bottles, food containers and other polyethylene terephthalate articles. An embodiment of the invention is one, any or all of prior embodiments in this paragraph up through the first embodiment in this paragraph wherein the feed in the polar solvent is at a temperature from about 150-200° C. and a pressure is about 1-100 atm. An embodiment of the invention is one, any or all of prior embodiments in this paragraph up through the first embodiment in this paragraph wherein the feed in the polar solvent is at a temperature from about 150-200° C. and a pressure is about 1-5 atm. An embodiment of the invention is one, any or all of prior embodiments in this paragraph up through the first embodiment in this paragraph wherein the polyethylene terephthalate and the polar solvent are at a weight ratio from about 1100 to 11. An embodiment of the invention is one, any or all of prior embodiments in this paragraph up through the first embodiment in this paragraph wherein the polyethylene terephthalate and the polar solvent are at a weight ratio of about 150 to 11. An embodiment of the invention is one, any or all of prior embodiments in this paragraph up through the first embodiment in this paragraph wherein the solvent and the anti-solvent are present at a weight ratio of from about 101 to 110. An embodiment of the invention is one, any or all of prior embodiments in this paragraph up through the first embodiment in this paragraph wherein the polyethylene terephthalate remains in the polar solvent from about 1 minute to 2 hours. An embodiment of the invention is one, any or all of prior embodiments in this paragraph up through the first embodiment in this paragraph wherein the polar solvent has Hansen solubility parameter of about $\delta_d$=15-20, $\delta_p$=4-20, $\delta_h$=3-10. An embodiment of the invention is one, any or all of prior embodiments in this paragraph up through the first embodiment in this paragraph wherein the anti-solvent has a Hansen solubility parameter of about $\delta d$=12-20, $\delta p$=0-4 $\delta h$=−0-4 An embodiment of the invention is one, any or all of prior embodiments in this paragraph up through the first embodiment in this paragraph wherein the polar solvent is selected from N-methylpyrrolidone, dimethylsulfoxide, dihydrolevoglucosenone, gamma-valerolactone, dimethyl isosorbide, N-methylcaprolactam, eucalyptol and mixtures thereof. An embodiment of the invention is one, any or all of prior embodiments in this paragraph up through the first embodiment in this paragraph wherein the anti-solvent is selected from alkanes, alkenes, aromatic hydrocarbons, and mixtures thereof. An embodiment of the invention is one, any or all of prior embodiments in this paragraph up through the first embodiment in this paragraph wherein the dissolved feed is filtered prior to addition of the anti-solvent to separate any undissolved material or dyes. An embodiment of the invention is one, any or all of prior embodiments in this paragraph up through the first embodiment in this paragraph wherein the process is a batch, continuous or semicontinuous process. An embodiment of the invention is one, any or all of prior embodiments in this paragraph up through the first embodiment in this paragraph wherein the feed further comprises other plastics including other thermoplastics and polyolefins and the process further comprises separating the other plastics from the polyethylene terephthalate prior to dissolution of the polyethylene terephthalate and either sending the other plastics to a pyrolysis reactor or to be mechanically sorted for further processing. An embodiment of the invention is one, any or all of prior embodiments in this paragraph up through the first embodiment in this paragraph wherein the separation of the other plastics from the polyethylene terephthalate is by density difference or hand sorting. An embodiment of the invention is one, any or all of prior embodiments in this paragraph up through the first embodiment in this paragraph wherein the polyolefins are sent to a pyrolysis reactor or are mechanically recycled for further processing.

Without further elaboration, it is believed that using the preceding description that one skilled in the art can utilize the present invention to its fullest extent and easily ascertain the essential characteristics of this invention, without departing from the spirit and scope thereof, to make various changes and modifications of the invention and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process of treating a feed comprising polyethylene terephthalate, said process comprising dissolving said feed in a polar solvent at a temperature between about 100 to 250° C. to produce a dissolved feed; then cooling the dissolved feed to precipitate a solid comprising precipitation of purified polyethylene terephthalate and further separating solid purified polyethylene terephthalate from remaining liquids, wherein said polar solvent is selected from N-methylpyrrolidone, dimethylsulfoxide, dihydrolevoglucosenone, gamma-valerolactone, dimethyl isosorbide, N-methylcaprolactam, eucalyptol and mixtures thereof.

2. The process of claim 1 further comprising centrifuging said dissolved feed to separate said purified polyethylene terephthalate from said dissolved feed.

3. The process of claim 1 further comprising adding an anti-solvent that is less polar than said polar solvent to said dissolved feed followed by said cooling of said dissolved feed to precipitate said purified polyethylene terephthalate, wherein said remaining liquids comprise said polar solvent and said anti-solvent.

4. The process of claim 3 wherein said remaining liquids are purified by distillation, adsorption or phase separation and separated into said polar solvent and said anti-solvent for reuse.

5. The process of claim 1 wherein said feed comprises a mixture of post-consumer polyethylene terephthalate waste.

6. The process of claim 5 wherein said post-consumer polyethylene terephthalate waste, is selected from used water bottles, soda bottles, food containers and other polyethylene terephthalate articles.

7. The process of claim 1 wherein said feed in said polar solvent is at a temperature from about 150-200° C. and a pressure is about 1-100 atm.

8. The process of claim 1 wherein said feed in said polar solvent is at a temperature from about 150-200° C. and a pressure is about 1-5 atm.

9. The process of claim 1 wherein said polyethylene terephthalate and said polar solvent are at a weight ratio from about 1:100 to 1:1.

10. The process of claim 1 wherein said polyethylene terephthalate and said polar solvent are at a weight ratio of about 1:50 to 1:1.

11. The process of claim 2 wherein said solvent and said anti-solvent are present at a weight ratio of from about 10:1 to 1:10.

12. The process of claim 1 wherein said polyethylene terephthalate remains in said polar solvent from about 1 minute to 2 hours.

13. The process of claim 1 wherein said polar solvent has Hansen solubility parameter of about $\delta d$=15-20, $\delta p$=4-20, $\delta h$=3-10.

14. The process of claim 1 wherein said anti-solvent has a Hansen solubility parameter of about $\delta d$=12-20, $\delta p$=0-4 $\delta h$=−0-4.

15. The process of claim 1 wherein said anti-solvent is selected from alkanes, alkenes, aromatic hydrocarbons, and mixtures thereof.

16. The process of claim 1 wherein said dissolved feed is filtered prior to addition of said anti-solvent to separate any undissolved material or dyes.

17. The process of claim 1 wherein said process is a batch, continuous or semicontinuous process.

18. The process of claim 1 wherein said feed further comprises other thermoplastics and polyolefins and said process further comprises separating said other thermoplastics and polyolefins from said polyethylene terephthalate prior to dissolution of said polyethylene terephthalate and either sending said other thermoplastics and polyolefins to a pyrolysis reactor or to be mechanically sorted for further processing.

19. The process of claim 17 wherein said separation of said other plastics from said polyethylene terephthalate is by density difference or hand sorting.

20. The process of claim 17 wherein said polyolefins are sent to a pyrolysis reactor or are mechanically recycled for further processing.

* * * * *